(12) United States Patent  (10) Patent No.: US 7,707,870 B2
Bustamante  (45) Date of Patent: May 4, 2010

(54) METHOD AND APPARATUS FOR OIL LEAK TESTING

(75) Inventor: Anthony T. Bustamante, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 259 days.

(21) Appl. No.: 11/778,112

(22) Filed: Jul. 16, 2007

(65) Prior Publication Data

US 2009/0019922 A1  Jan. 22, 2009

(51) Int. Cl.
 *G01M 3/26* (2006.01)
(52) U.S. Cl. ....................................................... 73/49.2
(58) Field of Classification Search ............ 73/38–49.8, 73/114.77
See application file for complete search history.

(56) References Cited

U.S. PATENT DOCUMENTS

| 3,340,724 | A | * | 9/1967 | Casey | 73/49.2 |
| 4,675,834 | A | * | 6/1987 | Furuse | 702/51 |
| 5,303,576 | A | * | 4/1994 | Erdelsky | 73/40 |
| 5,576,480 | A | * | 11/1996 | Hopkins et al. | 73/38 |
| 6,494,797 | B1 | * | 12/2002 | Homm et al. | 474/18 |
| 6,935,163 | B2 | * | 8/2005 | Stewart et al. | 73/49.7 |
| 2005/0155582 | A1 | * | 7/2005 | Schelhas et al. | 123/497 |
| 2009/0100821 | A1 | * | 4/2009 | Prabhu | 60/39.094 |

* cited by examiner

*Primary Examiner*—John Fitzgerald
(74) *Attorney, Agent, or Firm*—Ralph E. Smith

(57) ABSTRACT

A method and apparatus to test for oil leaks in an engine component after being machined. The method and apparatus include a wash station that washes the engine component after being machined, and a buffer that heats the engine component to a first temperature. An oil leak test station tests the engine component at about the first temperature for oil leaks.

19 Claims, 2 Drawing Sheets

METHOD AND APPARATUS FOR OIL LEAK TESTING

FIELD

The present invention relates to a method and apparatus for oil leak testing.

BACKGROUND

Engine components such as a block or transmission are generally die cast components that are machined on an assembly line to have various shapes, bores, and through-holes formed therein. Because the components are generally die cast, the components may have porosities. After the components are machined and finished, these porosities may be opened or connected to create larger. This is disadvantageous because the engine components are generally filtered with oil or some other lubricant that assists in lubricating the various moving parts of the completed engine or transmission. Accordingly, it is common to test the engine component for any oil leaks that may be present due to manufacturing tolerances or, more importantly, due to open porosities that may have been formed during machining.

One such oil test is generally known as a cold test. During a cold test, the engine component is placed in an oil testing device and pressurized air is injected into the component. Then, the decay rate of pressurized a leaving the component is measured to determine whether any leaks are present in the component. If the decay rate is too high, the component is discarded due to the presence of a leak that may cause the engine component to fail when the component is placed in a motor vehicle.

A cold test, however, has a disadvantage in that the engine component is tested at temperatures that are less than an operating temperature (i.e., a temperature that the component will reach during use in a motor vehicle). In other words, the engine component undergoes thermal expansion at operating temperatures which may cause any porosities that may be present in the engine component to expand. This expansion of the porosities may cause the development of oil leaks that may otherwise go undetected when the engine component is being tested for leaks during a cold test.

SUMMARY

The present teachings provide a method for oil leak testing that includes cleaning an engine component with a wash cycle that raises the engine component to a first temperature. After cleaning the engine components the first temperature of the engine component is elevated from said first temperature to a second temperature. Then, the engine component is tested for a leak at about the second temperature.

The present teachings also provide an apparatus to test for oil leaks in an engine component after being machined. The apparatus includes a wash station that washes the engine component after being machined and a buffer that heats the engine component to a first temperature. An oil leak test station tests the engine component at about the first temperature for oil leaks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
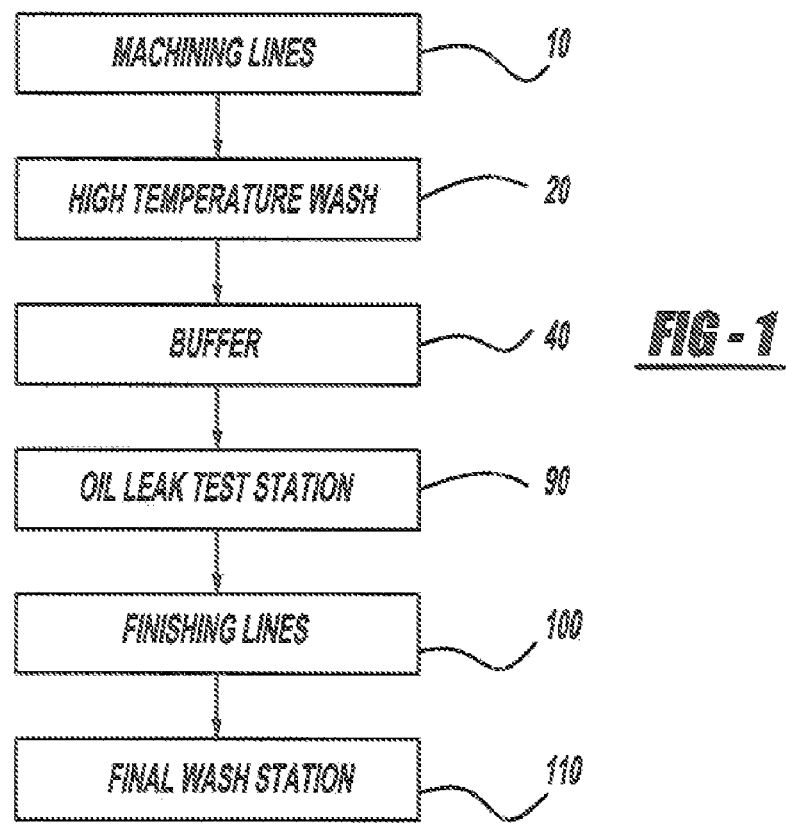
FIG. 1 is a schematic representation of a manufacturing line for fabricating engine components according to the present teachings.
Figure 2:
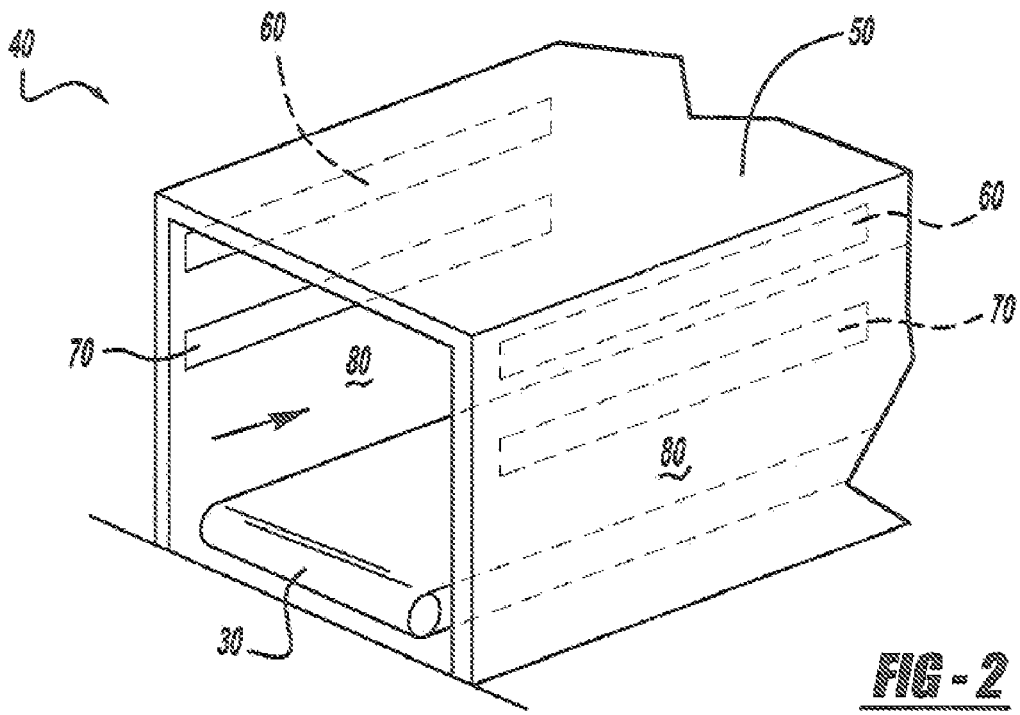
FIG. 2 is a perspective view of a buffer that may be used in conjunction with the present teachings.
Figure 3:
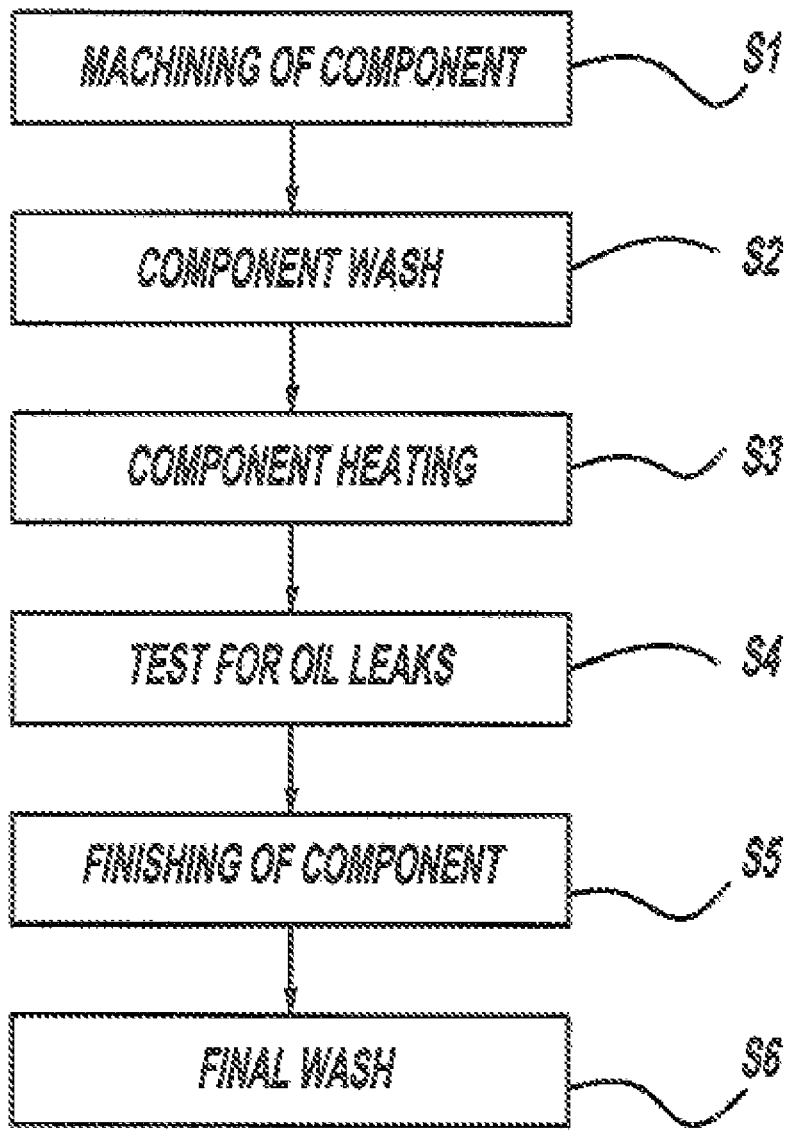
FIG. 3 is a flow chart illustrating various steps that may be used in a method for oil leak testing according to the present teachings.

Referring to FIGS. 1-3, a method for oil leak testing and apparatus according to the present teachings will now be described. FIGS. 1 and 3 are schematic representations of a manufacturing line for fabricating engine components (FIG. 1) and a method for oil leak testing (FIG. 3) according to the present teachings. Engine components may include engine blocks or transmission components that may be used in a motor vehicle. In general, to manufacture these components, the components are die cast. After being die cast, the components are machined during a first step S1 using a plurality of machining lines 10. Machining lines 10 may include various stations that are connected by conveyors or rails (not shown) that carry the component through the manufacturing process. The stations that form machining lines 10 may include stations that form bores in the components, form bolt holes in the components, mill the components, shape the components, etc. One skilled in the art well readily acknowledge and appreciate the various stations that may form machining lines 10.

After the component has bean machined using machining lines 10, the component may be subjected to a high temperature wash 20. High temperature wash 20 cleans the component (Step S2) of any oil, dust, shavings, metal contaminants, or burrs that may be present in the engine component after passing through machining lines 10. During high temperature wash 20, water that may be at a temperature of about 130 degrees Fahrenheit may be dispensed from a plurality of jets or nozzles to clean the engine component. After cleaning the component using high temperature wash 20, a temperature of the engine component may be raised to a temperature approximately equal to that of the water used during high temperature wash 20 (e.g., 130 degrees Fahrenheit).

Once the component has been cleaned and the temperature of the engine component is at or about the temperature of the water used during high temperature wash 20, the component may be passed along a rail or conveyor belt 30 into a buffer 40. Referring to FIG. 2, buffer 40 may be a tunnel-shaped furnace or oven 50 that may include a plurality of heating devices 60 and sensors 70 that raise and monitor the temperature of the component to a predetermined level (Step S3). Buffer 40 may be insulated so that heat generated by heating devices 60 is not lost to the ambient atmosphere. A length of buffer 40 may be any length sufficient to raise a temperature of the component to an operating temperature. In this regard, the length of buffer 40 may be in a range of 10-40 feet (3.048 m to 12.192 m) long. Preferably, the length of buffer 40 is 15-30 feet (4.572 m to 9.144 m) long, and more preferably 20-25 feet (6.096 m to 7.62 m) long.

Heating devices 60 and sensors 70 may be formed in the walls 80 of the buffer 40, or may be mounted to walls 80 of buffer 40. Heating devices 60 may be any type of heating devices known in the art. In this regard, inductive heating devices, infrared heating devices, electric heating devices, or gas heating devices may be used, without limitation. To monitor a temperature of the buffer 40, buffer 40 may also be provided with various sensors 70. Sensors 70 may be any type of sensor adapted to measure a temperature of buffer 40. For example, sensors 70 such as a thermocouple, a resistance sensor, a thermistor, a diode sensor, thermowells and the like may be used. Regardless, heating devices 60 and sensors 70 should be selected to accurately raise and monitor the temperature of buffer 40 and the component so that the component may be accurately and reliably raised to an operating temperature that may be reached during operation of a motor vehicle.

As the component passes through buffer 40, the temperature of the component is generally raised to an operating temperature of about 180 degrees Fahrenheit, which may be an operating temperature of the component. It should be understood, however, that temperatures greater than 180 degrees Fahrenheit are achievable, depending on the particular application for which the component will be used, For example, temperatures in the range of 200-300 degrees Fahrenheit, or greater, are contemplated by the present teachings. Regardless, the component should be raised to a temperature sufficient to cause the component to undergo thermal expansion.

After passing through the buffer 40, the engine component elevated to operating temperature may be transferred to an oil leak test station 90. At oil leak test station 90, the engine component is subjected to an air test (Step S4) that forces compressed air into the engine component and a pressure of the compressed air may be monitored to determine whether or not there are any leaks in the engine component. That is, the decay rate of pressurized air leaving the component is measured to determine whether any leaks are present in the component. If the decay rate is too high, the component is discarded due to the presence of a leak that may cause the engine component to fail when the component is placed in a motor vehicle.

Because the engine component is elevated to operating temperature, various porosities present in the component that may not have otherwise opened, increased in size, or been connected during a conventional oil leak cold test may develop due to thermal expansion of the engine component. If the porosities have opened, increased in size, or been connected after elevation of the engine component to operating temperature, subjecting the engine component to oil leak testing at testing station 90 white the engine component is at operating temperature enables detection of any oil leaks that may lead to failure of the engine component prior to placement of the engine component in the motor vehicle. Accordingly, if oil leaks are found, the engine component may be removed from the manufacturing line and discarded to be recycled.

Subsequent to the testing for oil leaks and if the component passes the oil leak test (i.e., no leaks are found and the component is acceptable for use), the engine component may be passed to finishing lines 100 where the engine component may be further machined to finish the component (Step S5). Lastly, the component will be subjected to a final wash station 110 which cleans the engine component (Step S6) of any remaining debris that may have developed during passage through finishing lines 100.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus to test for oil leaks in an engine component after being machined, said apparatus comprising:
    a wash station that washes the engine component after being machined;
    a buffer that heats the engine component to a first temperature; and
    an oil leak test station that tests the engine component at about said first temperature for oil leaks.

2. The apparatus of claim 1, wherein said wash station is a high-temperature wash station that raises the engine component to a second temperature.

3. The apparatus of claim 1, wherein said buffer is a furnace or oven.

4. The apparatus of claim 1, further comprising a conveyor for carrying the engine component through said buffer.

5. The apparatus of claim 1, wherein said buffer is an insulated tunnel.

6. The apparatus of claim 5, wherein said buffer includes at least one heating device.

7. The apparatus of claim 6, wherein said heating devices in integrated into a wail of said buffer.

8. The apparatus of claim 6, wherein said heating device is an infrared heating device or an inductive device.

9. The apparatus of claim 5, wherein said buffer includes at least one temperature sensor.

10. The apparatus of claim 9, wherein said temperature sensor is integrated into a wall of said buffer.

11. The apparatus of claim 9, wherein said temperature sensor is one of a thermocouple, a resistance sensor, a thermistor, a diode sensor, and a thermowell.

12. A method for oil leak testing an engine component prior to use in an engine, comprising:
    heating the component to a predetermined temperature;
    while the component is at about said temperature, forcing air into the component and monitoring a decay rate of said air leaving the component; and
    determining, based on said decay rate, whether the component will develop an oil leak during use in the engine, wherein the component is heated in a buffer.

13. The method of claim 12, wherein said temperature is an operating temperature of the component.

14. The method of claim 12, further comprising washing the component at a wash station before testing the component.

15. The method of claim 14, wherein said wash station is a high-temperature wash station.

16. The method of claim 12, wherein said buffer includes at least one heating device.

17. The method of claim 16, wherein said heating device is one of an infrared heating device, an inductive device, and a furnace.

18. The method of claim 12, further comprising monitoring said temperature with a temperature sensor.

19. The method of claim 18, wherein said monitoring of said temperature with said temperature sensor occurs in said buffer.

* * * * *